US012644722B2

(12) United States Patent
Li et al.

(10) Patent No.: US 12,644,722 B2
(45) Date of Patent: Jun. 2, 2026

(54) METHOD FOR SENDING ADDRESS OF POINT OF INTEREST, DEVICE FOR THE SAME, AND RELATED ELECTRONIC APPARATUS AND STORAGE MEDIUM

(71) Applicant: XIAOMI EV TECHNOLOGY CO., LTD., Beijing (CN)

(72) Inventors: Zehui Li, Beijing (CN); Kangkang Jin, Beijing (CN); Zejun Xu, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 119 days.

(21) Appl. No.: 18/517,511

(22) Filed: Nov. 22, 2023

(65) Prior Publication Data

US 2025/0003762 A1     Jan. 2, 2025

(30) Foreign Application Priority Data

Jun. 30, 2023     (CN) .......................... 202310798955.5

(51) Int. Cl.
*G01C 21/36*          (2006.01)
*H04W 4/12*          (2009.01)

(52) U.S. Cl.
CPC .......... *G01C 21/3679* (2013.01); *H04W 4/12* (2013.01)

(58) Field of Classification Search
CPC .............................. G01C 21/3679; H04W 4/12
USPC ........................................................ 701/430
See application file for complete search history.

(56) References Cited

U.S. PATENT DOCUMENTS

| | | | | |
|---|---|---|---|---|
| 6,128,482 | A * | 10/2000 | Nixon ..................... | G10L 15/18 |
| | | | | 379/88.04 |
| 8,566,029 | B1 | 10/2013 | Lopatenko et al. | |
| 10,135,965 | B2 * | 11/2018 | Woolsey ................. | H04W 4/12 |
| 11,210,310 | B2 * | 12/2021 | Vasilyev ................. | G06F 16/29 |
| 11,423,778 | B2 * | 8/2022 | Schulz ................. | B60K 28/066 |
| 2014/0351354 | A1 * | 11/2014 | Chandra ............... | H04L 65/403 |
| | | | | 709/204 |
| 2018/0231391 | A1 | 8/2018 | Yang et al. | |

(Continued)

FOREIGN PATENT DOCUMENTS

| | | |
|---|---|---|
| EP | 2141610 A2 | 1/2010 |
| WO | WO 2006020088 A1 | 2/2006 |
| WO | WO 2018141159 A1 | 8/2018 |

OTHER PUBLICATIONS

European patent application No. 23213046.8 Search Report dated May 15, 2024, 13 pages.

*Primary Examiner* — Andrew Joseph Rudy
(74) *Attorney, Agent, or Firm* — Cozen O'Connor

(57)          ABSTRACT

A method for sending an address of a point of interest includes: acquiring first text data in an address sending request in response to the address sending request; conducting a point of interest search according to the first text data to acquire at least one point of interest; outputting information on a candidate point of interest. The information on the candidate point of interest comprises second text data of the at least one point of interest. The method also includes determining, in response to returned confirmation information on the point of interest, a target point of interest according to the second text data in the confirmation information on the point of interest; and sending latitude and longitude data of the target point of interest to a vehicle terminal.

11 Claims, 7 Drawing Sheets

(56)            References Cited

U.S. PATENT DOCUMENTS

2020/0218696 A1 *   7/2020   Camhi  ................. G06F 3/0482
2021/0003417 A1      1/2021   Yoshikawa et al.

* cited by examiner

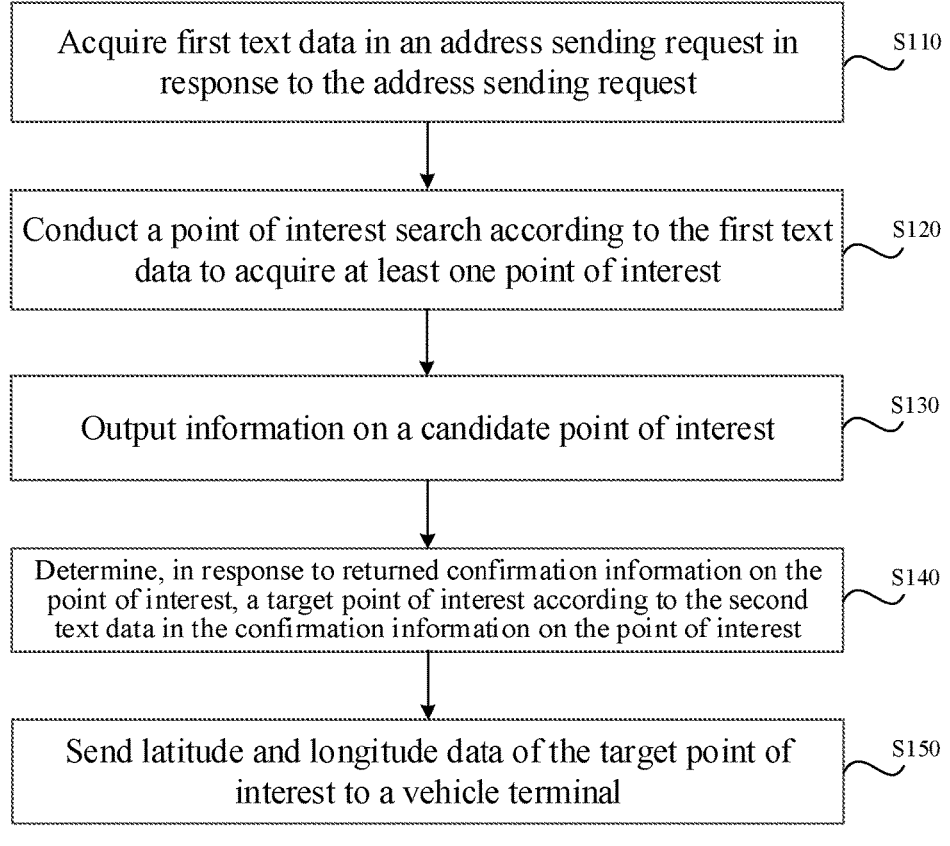

Acquire first text data in an address sending request in response to the address sending request ～ S110

Conduct a point of interest search according to the first text data to acquire at least one point of interest ～ S120

Output information on a candidate point of interest ～ S130

Determine, in response to returned confirmation information on the point of interest, a target point of interest according to the second text data in the confirmation information on the point of interest ～ S140

Send latitude and longitude data of the target point of interest to a vehicle terminal ～ S150

Acquire acquiring an address link in the address sending request and resolve the address link ～ S111

Acquire the first text data in response to a failure in determining the target point of interest according to an address link resolution result ～ S112

Fig.2

METHOD FOR SENDING ADDRESS OF POINT OF INTEREST, DEVICE FOR THE SAME, AND RELATED ELECTRONIC APPARATUS AND STORAGE MEDIUM

CROSS-REFERENCE TO RELATED APPLICATION

This application is based on and claims priority to Chinese Patent Application No. 202310798955.5 filed on Jun. 30, 2023, the entire content of which is incorporated herein by reference.

BACKGROUND

With the development of electronic maps and geographic information systems, location-based applications and functions play an important role in relevant life service platforms. In the related art, the way of sending addresses to a vehicle terminal is very limited, which cannot meet human-vehicle interaction demands.

SUMMARY

The present disclosure relates to the field of communication technology, in particular to a method for sending an address of a point of interest, an electronic apparatus, and a storage medium.

According to embodiments of a first aspect of the present disclosure, there is provided a method for sending an address of a point of interest. The method includes: acquiring first text data in an address sending request in response to the address sending request; conducting a point of interest search according to the first text data to acquire at least one point of interest; outputting information on a candidate point of interest, in which the information on the candidate point of interest includes second text data of the at least one point of interest; determining, in response to returned confirmation information on the point of interest, a target point of interest according to the second text data in the returned confirmation information on the point of interest; and sending latitude and longitude data of the target point of interest to a vehicle terminal.

According to embodiments of a second aspect of the present disclosure, there is provided an electronic apparatus including: a processor; and a memory for storing machine-readable instructions that, when executed by the processor, cause the processor to: acquire first text data in an address sending request in response to the address sending request; conduct a point of interest search according to the first text data to acquire at least one point of interest; output information on a candidate point of interest, in which the information on the candidate point of interest includes second text data of the at least one point of interest; determine, in response to returned confirmation information on the point of interest, a target point of interest according to the second text data in the returned confirmation information on the point of interest; and send latitude and longitude data of the target point of interest to a vehicle terminal.

According to embodiments of a third aspect of the present disclosure, there is provided computer-readable storage medium having computer program instructions stored therein that, when executed by a processor, cause the processor to: acquire first text data in an address sending request in response to the address sending request; conduct a point of interest search according to the first text data to acquire at least one point of interest; output information on a candidate point of interest, in which the information on the candidate point of interest includes second text data of the at least one point of interest; determine, in response to returned confirmation information on the point of interest, a target point of interest according to the second text data in the returned confirmation information on the point of interest; and send latitude and longitude data of the target point of interest to a vehicle terminal.

BRIEF DESCRIPTION OF DRAWINGS

The accompanying drawings, which are incorporated into and constitute a part of this specification, illustrate embodiments consistent with the present disclosure and together with the description, serve to explain the principles of the present disclosure.

FIG. 1 is a flow chart of a method for sending an address of a point of interest according to an embodiment.

FIG. 2 is a flow chart of an implementation method for step S110 in an embodiment of the present disclosure.

DETAILED DESCRIPTION

Figure 3:
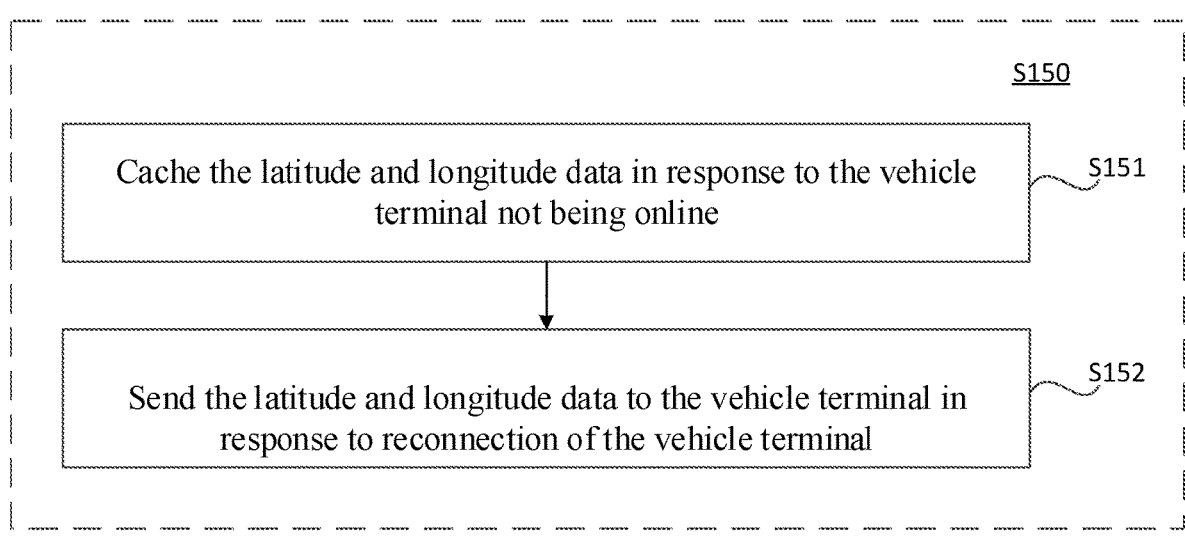
FIG. 3 is a flow chart of an implementation method for step S150 in an embodiment of the present disclosure.

Embodiments of the present disclosure will be described in detail, and examples of the embodiments will be shown in the accompanying drawings, in which the same or similar elements and the elements having same or similar functions are denoted by like reference numerals. The implementations described in the following embodiments do not represent all implementations consistent with the present disclosure. Instead, they are merely examples of devices and methods consistent with some aspects of the present disclosure as detailed in the appended claims.

It should be noted that all actions of obtaining signals, information or data in the present disclosure are performed in compliance with national data protection regulations and policies and with authorization granted by corresponding device owners.

FIG. 1 is a flow chart of a method for sending an address of a point of interest according to an embodiment. As shown in FIG. 1, the method includes the following steps.

In step S110, in response to an address sending request, first text data in the address sending request is acquired.

The first text data is data in text format. In some embodiments, the first text data includes an address or an address keyword in text format.

In some embodiments, the address sending request is triggered by a user behavior, and the first text data may be text related to the address manually input by a user or may be text with preset content generated based on the user behavior, in which a target of sending the address is a vehicle terminal. When the user needs to send a target address to the vehicle terminal, the address sending request is triggered by the user behavior such as pressing a button, touching, and a voice instruction.

In some embodiments, the address sending request comes from another third-party application program on the same terminal.

In step S120, a point of interest (POI) search is conducted according to the first text data to acquire at least one point of interest.

The point of interest is important information in a geographic information system, and an electronic map includes a large number of points of interest, which usually correspond to geographical entities such as shops, scenic spots, buildings and roads, and may be used for navigation, route planning and destination queries.

In some embodiments, the point of interest includes its corresponding second text data and latitude and longitude data. The second text data is data in text format and includes name text and address text, that is, a name of the point of interest and the address of the point of interest in text format. The latitude and longitude data are data necessary for navigation, route planning and destination queries.

In some embodiments, the at least one point of interest is matched from a database of points of interest according to the first text data.

In some embodiments, in step S120, conducting the point of interest search according to the first text data to acquire the at least one point of interest, includes: calling at least one web application programming interface (WebAPI) to conduct the point of interest search according to the first text data to acquire the at least one point of interest.

The web application programming interface corresponds to electronic map software, and after calling the corresponding web application programming interface, the point of interest search may be conducted based on a preset software development kit (SDK) of the electronic map software. In some embodiments, multiple web application programming interfaces are called to conduct the point of interest search based on multiple electronic map software or third-party platforms.

In step S130, information on a candidate point of interest is output.

The information on the candidate point of interest includes second text data of the at least one point of interest.

In some embodiments, the second text data includes name text and address text.

In some embodiments, the output information on the candidate point of interest is presented on a user side by one or more of various means including text display, icon display, video image display, voice broadcast and vibration prompt. In some embodiments, the above presentation methods can control execution of the terminal.

In step S140, in response to returned confirmation information on the point of interest, a target point of interest is determined according to the second text data in the confirmation information on the point of interest.

The confirmation information on the point of interest is generated based on the user behavior. In some embodiments, the user selects a desired point of interest from the at least one point of interest according to the information on the candidate point of interest, and the returned confirmation information on the point of interest includes the second text data of the point of interest selected by the user, so that the target point of interest in the at least one point of interest is determined according to the second text data in the confirmation information on the point of interest.

In step S150, latitude and longitude data of the target point of interest is sent to the vehicle terminal.

The vehicle terminal can perform functions such as navigation, route planning and destination queries based on the latitude and longitude data.

The method for sending the address of the point of interest according to embodiments of the present disclosure includes: acquiring the first text data in the address sending request in response to the address sending request; conducting the point of interest search according to the first text data to acquire the at least one point of interest; outputting the information on the candidate point of interest; determining the target point of interest according to the second text data in the confirmation information on the point of interest in response to the returned confirmation information on the point of interest; and sending the latitude and longitude data of the target point of interest to the vehicle terminal. Consequently, based on the information on the candidate point of interest, the selected point of interest is confirmed before the address is sent to the vehicle terminal, which can avoid sending incorrect addresses and improve the stability and accuracy of address sending.

FIG. 2 is a flow chart of an implementation method for step S110 in an embodiment of the present disclosure. As shown in FIG. 2, in step S110, before acquiring the first text data in the address sending request, the method further includes the following steps.

In step S111, an address link in the address sending request is acquired and the address link is resolved.

The address sending request is a request with a preset format, which is generated based on the user behavior and includes the first text data and the address link. In some embodiments, the first text data includes an address or an address keyword in text format, and the address link is an H5 link.

In step S112, in response to a failure in determining the target point of interest according to an address link resolution result, the first text data is acquired.

In some embodiments, in step S111, after acquiring the address link in the address sending request and resolving the address link, the method further includes: sending the latitude and longitude data to the vehicle terminal, in response to the target point of interest being determined according to the address link resolution result.

When the target point of interest cannot be determined by resolving the address link, for example, in the event of an error or failure in address resolution, the first text data in the address sending request is acquired; the point of interest search is conducted according to the first text data; the information on the candidate point of interest is output; and the target point of interest is determined according to the returned confirmation information on the point of interest. When the target point of interest is determined by resolving the address link, the latitude and longitude data of the target point of interest is sent to the vehicle terminal.

As a result, when the target point of interest cannot be determined based on the resolution of the address link, the point of interest search is conducted according to the first text data, the information on the candidate point of interest is output, and the target point of interest is determined according to the returned confirmation information on the point of interest, which cannot only known the address link resolution result, but also obtain the accurate address even when the target point of interest cannot be determined by resolving the address link, and send the accurate address to the vehicle terminal, improving the stability and accuracy of address sending.

FIG. 3 is a flow chart of an implementation method for step S150 in an embodiment of the present disclosure. As shown in FIG. 3, in step S150, sending the latitude and longitude data of the target point of interest to the vehicle terminal includes the following steps.

In step S151, the latitude and longitude data is cached in response to the vehicle terminal not being online.

In response to the fact that the vehicle terminal is not online and the longitude data and latitude data of the target point of interest cannot be received in time, the latitude and longitude data of the target point of interest is cached.

The vehicle terminal being not online includes not being powered on, not being online, being in an environment with restricted signal conditions, and so on.

In step S152, in response to reconnection of the vehicle terminal, the latitude and longitude data is sent to the vehicle terminal.

In response to the reconnection of the vehicle terminal, for example, the vehicle terminal being powered on, being online, and being in an environment where communication interaction may be carried out under signal conditions, the latitude and longitude data of the target point of interest is sent to the vehicle terminal.

Therefore, when the vehicle terminal cannot receive the latitude and longitude data of the target point of interest in time, the latitude and longitude data of the target point of interest is cached, and the latitude and longitude data is sent in time after the vehicle terminal is reconnected, which can ensure the stability of address sending.

Figure 4:
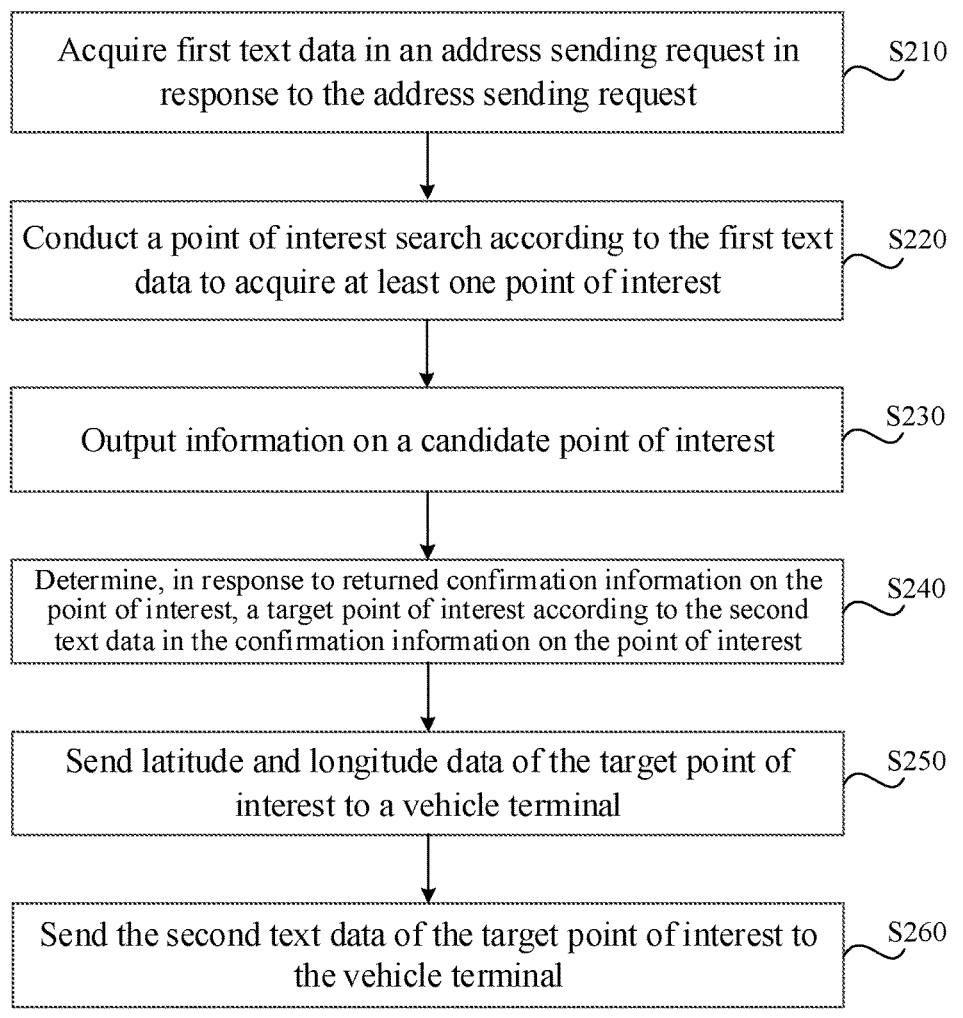
FIG. 4 is a flow chart of another method for sending an address of a point of interest according to an embodiment.

FIG. 4 is a flow chart of another method for sending an address of a point of interest according to an embodiment. As shown in FIG. 4, the method includes the following steps.

In step S210, in response to an address sending request, first text data in the address sending request is acquired.

In step S220, a point of interest search is conducted according to the first text data to acquire at least one point of interest.

In step S230, information on a candidate point of interest is output.

The information on the candidate point of interest includes second text data of the at least one point of interest.

In step S240, in response to returned confirmation information on the point of interest, a target point of interest is determined according to the second text data in the confirmation information on the point of interest.

In step S250, latitude and longitude data of the target point of interest is sent to a vehicle terminal.

In step S260, the second text data of the target point of interest is sent to the vehicle terminal.

The second text data is used for broadcasting at the vehicle terminal. For example, the vehicle terminal broadcasts according to the second text data, and on this basis, the user can confirm the address of the point of interest sent to the vehicle terminal, ensuring the subsequent implementation of navigation, route planning, destination queries and other functions.

It should be noted that the embodiments of the present disclosure do not limit the execution order of step S250 and step S260. That is, step S250 may be executed before step S260, or step S250 may be executed after step S260, or step S250 and step S260 may be executed simultaneously.

The method for sending the address of the point of interest according to the present disclosure will be described in combination with practical applications.

Figure 5:
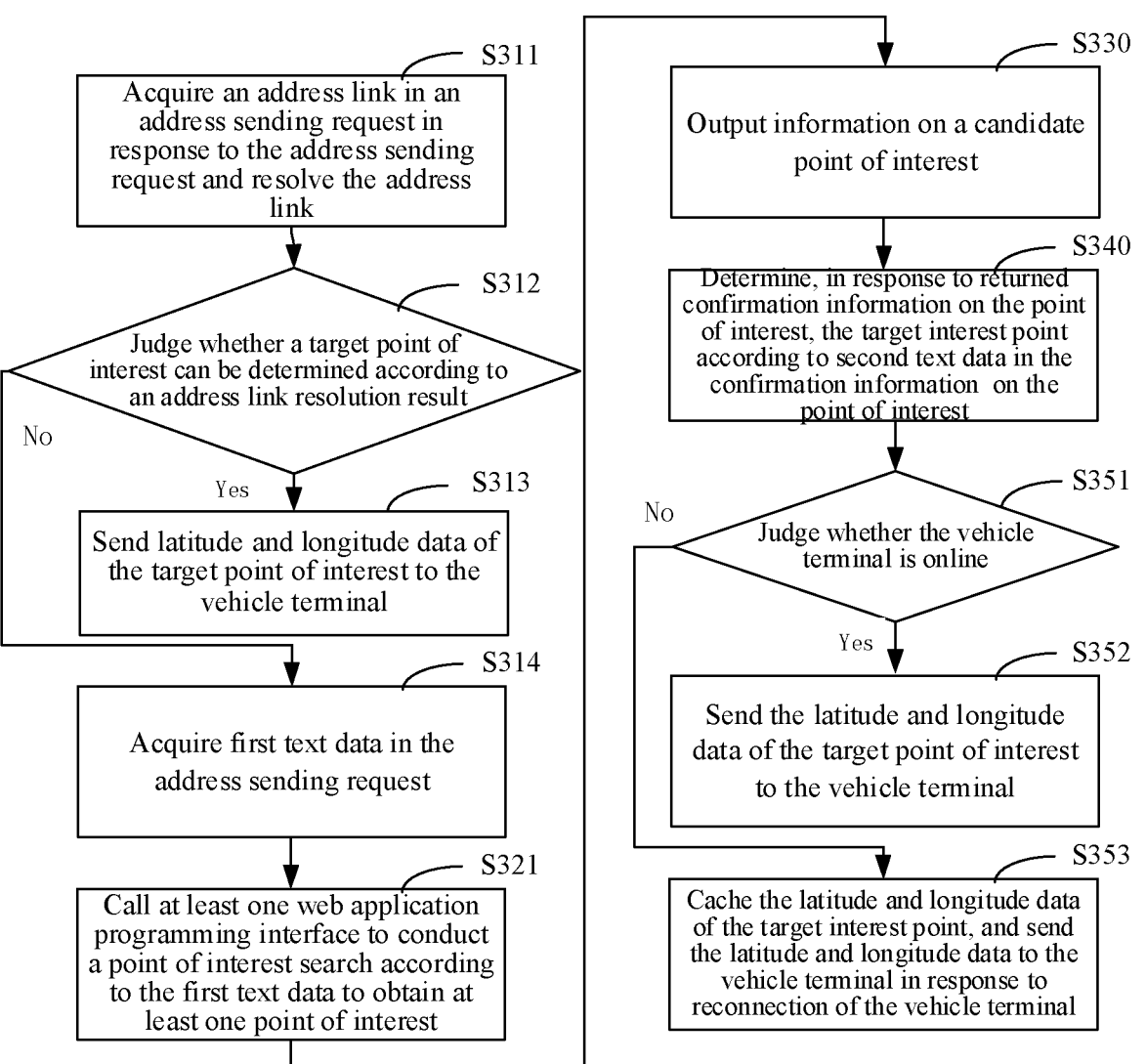
FIG. 5 is a flow chart of yet another method for sending an address of a point of interest according to an embodiment.

FIG. 5 is a flow chart of yet another method for sending an address of a point of interest according to an embodiment. As shown in FIG. 5, the method includes the following steps.

In step S311, in response to an address sending request, an address link in the address sending request is acquired and the address link is resolved.

In step S312, it is judged whether a target point of interest may be determined according to an address link resolution result.

In step S312, in response to the target point of interest being determined according to the address link resolution result, step S313 is executed; in response to the target point of interest not being determined according to the address link resolution result, step S314 is executed.

In step S313, latitude and longitude data of the target point of interest is sent to the vehicle terminal.

In step S314, first text data in the address sending request is acquired.

In step S321, at least one web application programming interface is called to conduct a point of interest search according to the first text data, to acquire at least one point of interest.

In step S330, information on a candidate point of interest is output.

The information on the candidate point of interest includes second text data of the at least one point of interest, and the second text data includes name text and address text.

Figure 6:
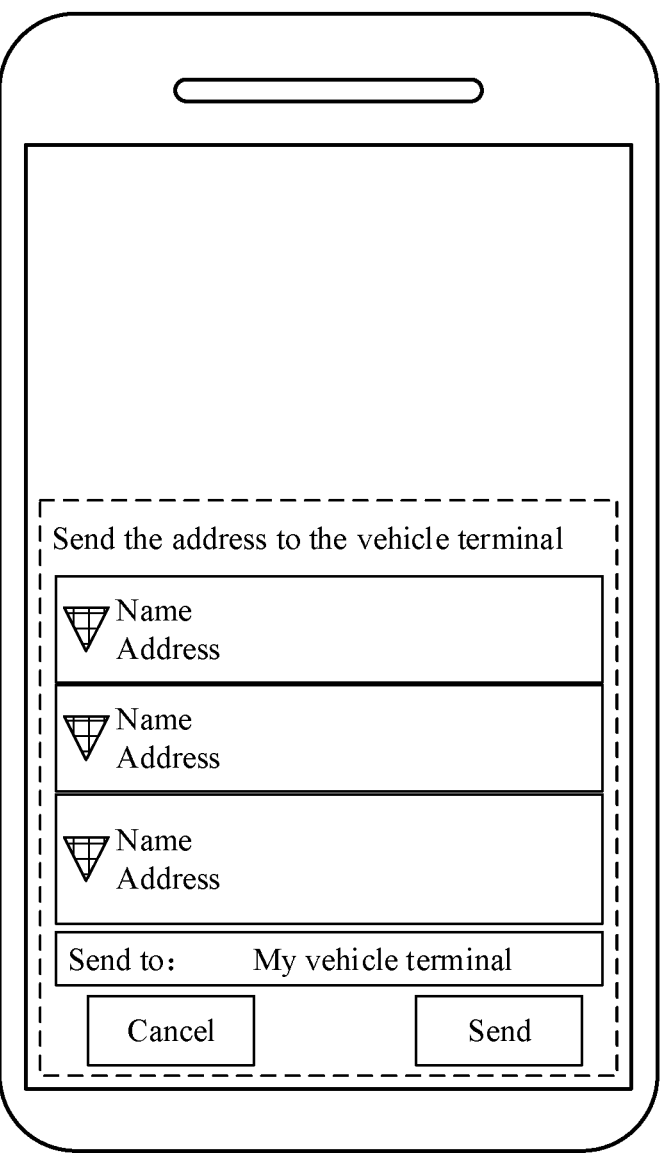
FIG. 6 is a schematic diagram of a terminal interface according to an embodiment.

FIG. 6 is a schematic diagram of a terminal interface according to an embodiment. As shown in FIG. 6, the information on the candidate point of interest is displayed in a pop-up window. The vehicle terminal may also be called a car, a vehicle, a vehicle machine, or a vehicle-mounted terminal, which is not limited thereto. FIG. 6 shows that the information on the candidate point of interest includes second text data of three points of interest. A dashed box is used to represent the pop-up window. In a point of interest column of the pop-up window, a triangle filled with grid lines is a position icon. "Name" and "Address" are used to show the name text and address text of each point of interest respectively. A target is filled after "Send to:" in a target sending column of the pop-up window. An identification of the target may be named by the user, or a preset vehicle identification may be used. For example, the target shown in FIG. 6 is "My Vehicle Terminal". The user may click a "Cancel" button below to cancel sending the address to the vehicle terminal, and the user may click a "Send" button to send the address to the vehicle terminal.

In step S340, in response to returned confirmation information on the point of interest, a target point of interest is determined according to second text data in the confirmation information on the point of interest.

In step S351, it is judged whether the vehicle terminal is online.

In step S351, in response to the vehicle terminal being online, step S352 is executed; in response to the vehicle terminal not being online, step S353 is executed.

In step S352, latitude and longitude data of the target point of interest is sent to the vehicle terminal.

In step S353, the latitude and longitude data of the target point of interest is cached, and the latitude and longitude data is sent to the vehicle terminal in response to reconnection of the vehicle terminal.

In the above way, the address is sent to the vehicle terminal.

Figure 7:
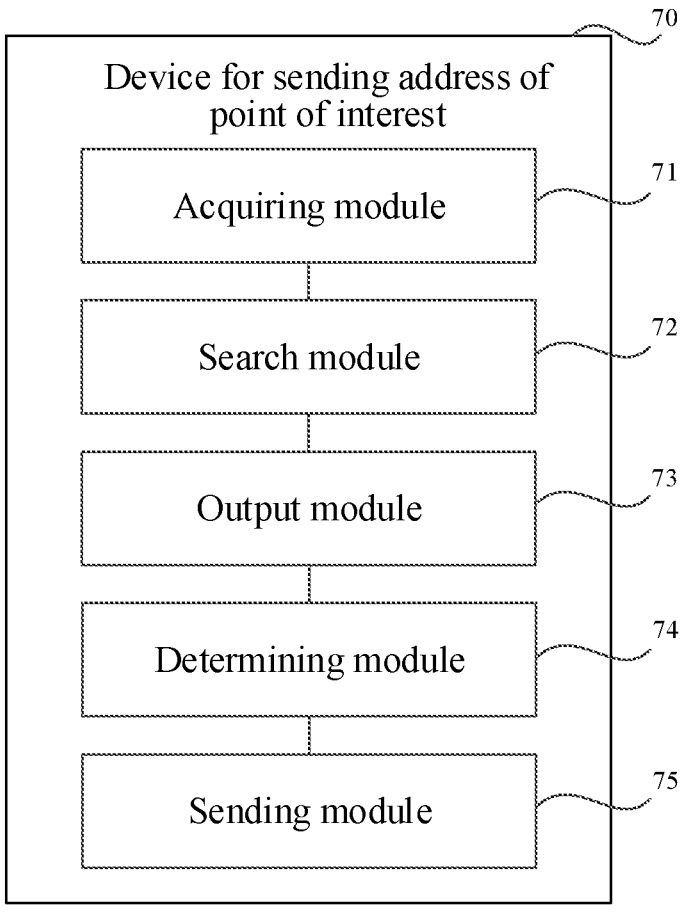
FIG. 7 is a block diagram of a device for sending an address of a point of interest according to an embodiment.

FIG. 7 is a block diagram of a device 70 for sending an address of a point of interest according to an embodiment.

As shown in FIG. 7, the device 70 includes an acquiring module 71, a search module 72, an output module 73, a determining module 74, and a sending module 75.

The acquiring module 71 is configured to acquire first text data in an address sending request in response to the address sending request.

The search module 72 is configured to conduct a point of interest search according to the first text data to acquire at least one point of interest.

The output module 73 is configured to output information on a candidate point of interest, in which the information on the candidate point of interest includes second text data of the at least one point of interest.

The determining module 74 is configured to determine, in response to returned confirmation information on the point of interest, a target point of interest according to the second text data in the confirmation information on the point of interest.

The sending module 75 is configured to send latitude and longitude data of the target point of interest to a vehicle terminal.

In some embodiments, the second text data includes name text and address text.

In some embodiments, the acquiring module 71 is configured to acquire an address link in the address sending request and resolve the address link; and acquire the first text data in response to a failure in determining the target point of interest according to an address link resolution result.

In some embodiments, the sending module 75 is configured to send the latitude and longitude data to the vehicle terminal in response to the target point of interest being determined according to the address link resolution result.

In some embodiments, the sending module 75 is configured to cache the latitude and longitude data in response to the vehicle terminal not being online; and send the latitude and longitude data to the vehicle terminal in response to reconnection of the vehicle terminal.

In some embodiments, the sending module 75 is configured to send the second text data of the target point of interest to the vehicle terminal, in which the second text data is broadcast by the vehicle terminal.

In some embodiments, the search module 72 is configured to call at least one web application programming interface to conduct the point of interest search according to the first text data to acquire the at least one point of interest.

With regard to the device in the above embodiments, the specific way in which each module performs operations has been described in detail in the embodiments related to the above method, and will not be described in detail here.

The present disclosure also provides a computer-readable storage medium having stored therein computer program instructions, which, when executed by a processor, realize steps of the method according to the present disclosure.

Figure 8:
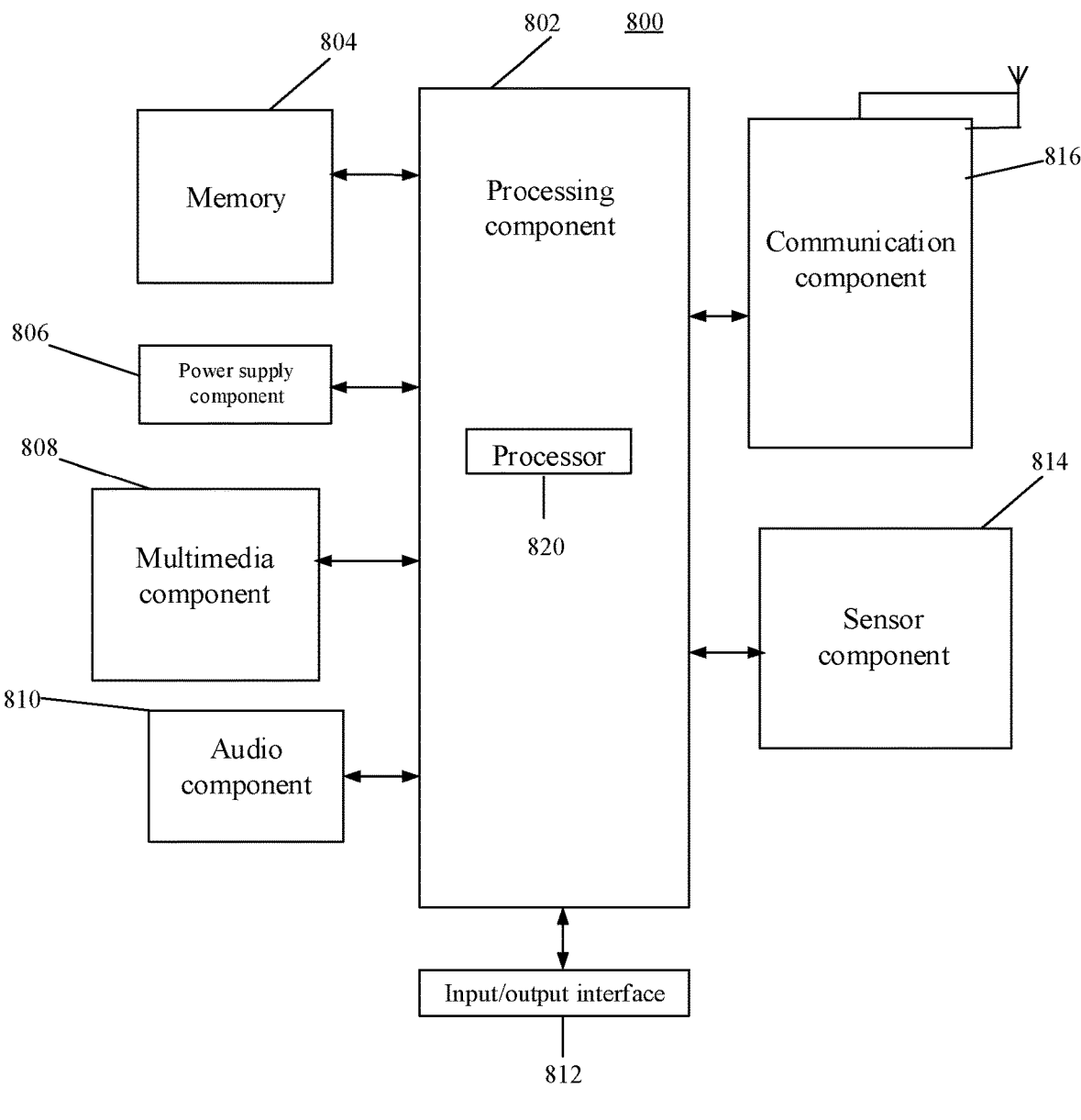
FIG. 8 is a block diagram of an electronic apparatus 800 according to an embodiment.

FIG. 8 is a block diagram of an electronic apparatus 800 according to an embodiment. For example, the electronic apparatus 800 may be a mobile phone, a computer, a digital broadcasting terminal, a messaging device, a game console, a tablet device, a medical device, a fitness device, a personal digital assistant and the like.

Referring to FIG. 8, an electronic apparatus 800 may include one or more of the following components: a processing component 802, a memory 804, a power supply component 806, a multimedia component 808, an audio component 810, a input/output interface 812, a sensor component 814, and a communication component 816.

The processing component 802 generally controls the overall operation of the electronic apparatus 800, such as operations associated with display, telephone call, data communication, camera operation and recording operation. The processing component 802 may include one or more processors 820 to execute instructions to complete all or part of the steps of the methods for sending the address of a point of interest described in all the above embodiments. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations in the electronic apparatus 800. Examples of these data include instructions for any application or method operating on the electronic apparatus 800, contact data, phone book data, messages, pictures, videos, and the like. The memory 804 may be realized by any type of volatile or nonvolatile memory device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 806 provides power to various components of the electronic apparatus 800. The power supply component 806 may include a power management system, one or more power supplies, and other components associated with generating, managing and distributing power for the electronic apparatus 800.

The multimedia component 808 includes a screen that provides an output interface between the electronic apparatus 800 and the user. In some embodiments, the screen may include a liquid crystal display (LCD) and a touch panel (TP). When the screen includes a touch panel, the screen may be implemented as a touch screen to receive an input signal from a user. The touch panel includes one or more touch sensors to sense touch, sliding and gestures on the touch panel. The touch sensor may not only sense the boundary of a touch or sliding action, but also detect the duration and pressure related to the touch or sliding operation. In some embodiments, the multimedia component 808 includes a front camera and/or a rear camera. When the electronic apparatus 800 is in an operation mode, such as a shooting mode or a video mode, the front camera and/or the rear camera can receive external multimedia data. Each front camera and rear camera may be a fixed optical lens system or have focal length and optical zoom capability.

The audio component 810 is configured to output and/or input audio signals. For example, the audio component 810 includes a microphone (MIC) configured to receive external audio signals when the electronic apparatus 800 is in an operation mode, such as a call mode, a recording mode and a voice recognition mode. The received audio signal may be further stored in the memory 804 or transmitted via the communication component 816. In some embodiments, the audio component 810 further includes a speaker for outputting audio signals.

The input/output interface 812 provides an interface between the processing component 802 and a peripheral interface module, which may be a keyboard, a click wheel, buttons, etc. These buttons may include, but are not limited to, home button, volume button, start button and lock button.

The sensor component 814 includes one or more sensors for providing various aspects of status assessment for the electronic apparatus 800. For example, the sensor component 814 can detect the on/off state of the electronic apparatus 800, the relative positioning of components, such as the display and keypad of the electronic apparatus 800. The sensor component 814 can also detect the position change of the electronic apparatus 800 or a component of the electronic apparatus 800, the presence or absence of user contact with the electronic apparatus 800, the orientation or acceleration/deceleration of the electronic apparatus 800, and the temperature change of the electronic apparatus 800. The sensor component 814 may include a proximity sensor configured to detect the presence of a nearby object without any physical contact. The sensor component 814 may also include an optical sensor, such as a CMOS or CCD image sensor, for use in imaging applications. In some embodiments, the sensor component 814 may further include an acceleration sensor, a gyro sensor, a magnetic sensor, a pressure sensor or a temperature sensor.

The communication component 816 is configured to facilitate wired or wireless communication between the electronic apparatus 800 and other devices. The electronic apparatus 800 can access a wireless network based on communication standards, such as Wi-Fi, 2G, 3G, 4G, 5G, or a combination thereof. In an embodiment, the communication component 816 receives a broadcast signal or broadcast related information from an external broadcast management system via a broadcast channel. In an embodiment, the communication component 816 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In some embodiments, the electronic apparatus 800 may be implemented by one or more application-specific integrated circuits (ASIC), digital signal processors (DSP), digital signal processing devices (DSPD), programmable logic devices (PLD), field programmable gate arrays (FPGA), controllers, microcontrollers, microprocessors or other electronic components, and used for executing the methods for sending the address of a point of interest described in all the above embodiments.

In some embodiments, there is also provided a non-transitory computer-readable storage medium including instructions, such as the memory 804 including instructions. The instructions may be executed by the processor 820 of the electronic apparatus 800 to complete the methods for sending the address of the point of interest described in all the above embodiments. For example, the non-transitory computer-readable storage medium may be ROM, random access memory (RAM), CD-ROM, magnetic tape, floppy disk, optical data storage device, etc.

In other embodiments, a computer program product is also provided, which includes a computer program executable by a programmable device. The computer program has a code portion for executing the above-mentioned method when executed by the programmable device.

Figure 9:
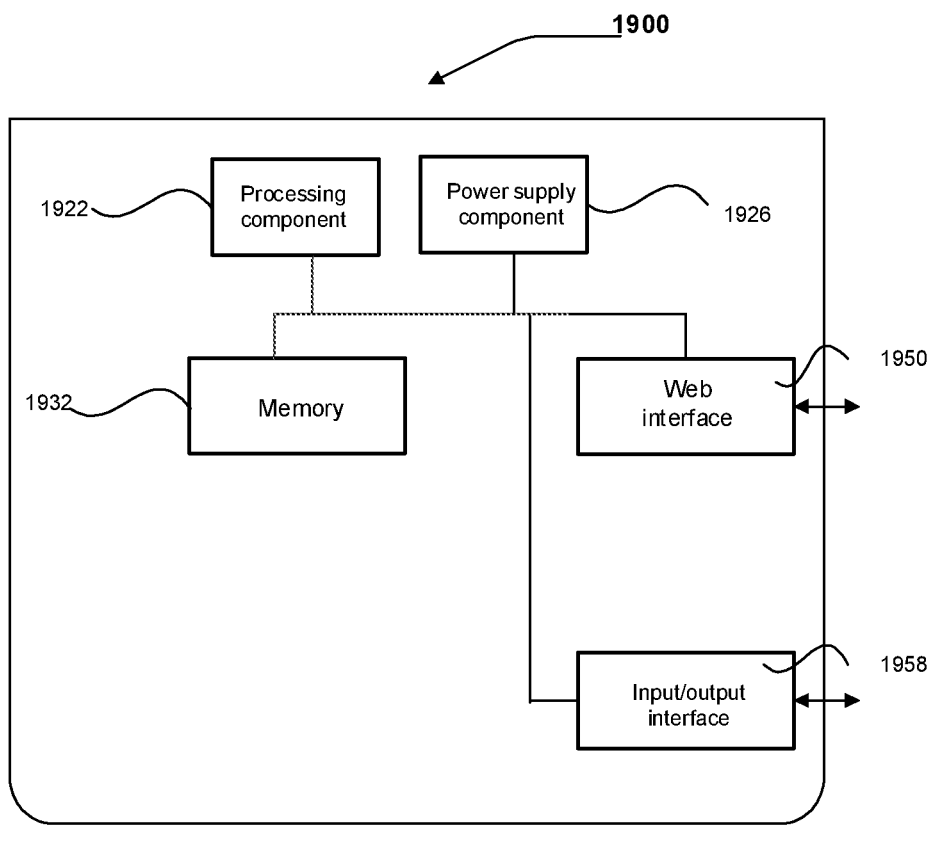
FIG. 9 is a block diagram of another electronic apparatus 1900 according to an embodiment.

FIG. 9 is a block diagram of another electronic apparatus 1900 according to an embodiment. For example, the electronic apparatus 1900 may be provided as a server device. Referring to FIG. 9, the electronic apparatus 1900 includes a processing component 1922, which further includes one or more processors, and memory resources represented by a memory 1932 for storing instructions executable by the processing component 1922, such as application programs. The application program stored in the memory 1932 may include one or more modules each corresponding to a set of instructions. In addition, the processing component 1922 is configured to execute instructions to execute the methods for sending the address of the point of interest described in all the above embodiments.

The electronic apparatus 1900 may further include a power supply component 1926 configured to perform power management of the electronic apparatus 1900, a wired or wireless web interface 1950 configured to connect the electronic apparatus 1900 to a network, and a input/output interface 1958. The electronic apparatus 1900 can operate based on an operating system stored in the memory 1932, such as Windows Server™, Mac OS X™, Unix™, Linux™, FreeBSD™ or the like.

Other embodiments of the present disclosure may be conceivable for those skilled in the art after considering the specification and practicing the technical solutions disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are regarded as exemplary only, and the true scope of the present disclosure are indicated by the appended claims.

It should be understood that the present disclosure is not limited to the particular structures described above and shown in the drawings, and various modifications and changes can be made without departing from the scope of the present disclosure. The scope of the present disclosure is only limited by the appended claims.

What is claimed is:

1. A method for sending an address of a target point of interest in an electronic map, performed by an electronic apparatus, comprising:

acquiring first text data in an address sending request in response to the address sending request, wherein the address sending request comprises the first text data and an address link;

conducting a point of interest search according to the first text data to acquire a point of interest; wherein conducting the point of interest search according to the first text data to acquire the point of interest comprises:

calling a web application programming interface to conduct the point of interest search according to the first text data to acquire the point of interest;

outputting second text data of the point of interest, the point of interest comprises the second text data and latitude and longitude data;

determining, in response to returned confirmation information on the point of interest, the target point of interest according to the second text data in the returned confirmation information on the point of interest, wherein the returned confirmation information on the point of interest is selected by and returned from a user to the electronic apparatus; and sending latitude and longitude data of the target point of interest to a vehicle, wherein before acquiring the first text data in the address sending request, the method further comprises:

acquiring the address link in the address sending request and resolving the address link;

determining the target point of interest according to an address link resolution result, and acquiring the first text data in the address sending request comprises: acquiring the first text data in response to a failure in determining the target point of interest according to the address link resolution result, wherein after acquiring the address link in the address sending request and resolving the address link, the method further comprises:

sending the latitude and longitude data to the vehicle in response to the target point of interest being determined according to the address link resolution result.

2. The method according to claim 1, wherein the second text data comprises name text and address text.

3. The method according to claim 1, wherein sending the latitude and longitude data of the target point of interest to the vehicle comprises:

caching the latitude and longitude data in response to the vehicle not being online; and sending the latitude and longitude data to the vehicle in response to reconnection of the vehicle.

4. The method according to claim 1, wherein after determining the target point of interest according to the second text data in the returned confirmation information on the point of interest, the method further comprises:

sending the second text data of the target point of interest to the vehicle, wherein the second text data is broadcast by the vehicle.

5. An electronic apparatus, comprising:

a processor; and a memory storing machine-readable instructions that, when executed by the processor, cause the processor to:

acquire first text data in an address sending request in response to the address sending request, wherein the address sending request comprises the first text data and an address link;

conduct a point of interest search in an electronic map according to the first text data to acquire a point of interest; wherein the processor is further configured to:

call a web application programming interface to conduct the point of interest search according to the first text data to acquire the point of interest;

output second text data of the point of interest, the point of interest comprises the second text data and latitude and longitude data;

determine, in response to returned confirmation information on the point of interest, a target point of interest according to the second text data in the returned confirmation information on the point of interest, wherein the returned confirmation information on the point of interest is selected by and returned from a user to the electronic apparatus; and send latitude and longitude data of the target point of interest to a vehicle, wherein before acquiring the first text data in the address sending request, the method further comprises:

acquiring the address link in the address sending request and resolving the address link;

determining the target point of interest according to an address link resolution result, and acquiring the first text data in the address sending request comprises: acquiring the first text data in response to a failure in determining the target point of interest according to the address link resolution result, wherein the processor is further configured to:

send the latitude and longitude data to the vehicle in response to the target point of interest being determined according to the address link resolution result.

6. The electronic apparatus according to claim 5, wherein the second text data comprises name text and address text.

7. The electronic apparatus according to claim 5, wherein the processor is further configured to:

cache the latitude and longitude data in response to the vehicle not being online; and send the latitude and longitude data to the vehicle in response to reconnection of the vehicle.

8. The electronic apparatus according to claim 5, wherein the processor is further configured to:

send the second text data of the target point of interest to the vehicle, wherein the second text data is broadcast by the vehicle.

9. A computer-readable storage medium having computer program instructions stored therein that, when executed by a processor, cause the processor to:

acquire first text data in an address sending request in response to the address sending request, wherein the address sending request comprises the first text data and an address link;

conduct a point of interest search in an electronic map according to the first text data to acquire a point of interest; wherein the processor is further configured to:

call a web application programming interface to conduct the point of interest search according to the first text data to acquire the point of interest;

output second text data of the point of interest, the point of interest comprises the second text data and latitude and longitude data;

determine, in response to returned confirmation information on the point of interest, a target point of interest according to the second text data in the confirmation information on the point of interest, wherein the returned confirmation information on the point of interest is selected by and returned from a user to the electronic apparatus; and send latitude and longitude data of the target point of interest to a vehicle, wherein before acquiring the first text data in the address sending request, the method further comprises:

acquiring the address link in the address sending request and resolving the address link;

determining the target point of interest according to an address link resolution result, and acquiring the first text data in the address sending request comprises: acquiring the first text data in response to a failure in determining the target point of interest according to the address link resolution result, wherein the processor is further configured to:

send the latitude and longitude data to the vehicle in response to the target point of interest being determined according to the address link resolution result.

10. The computer-readable storage medium according to claim 9, wherein the processor is further configured to:

cache the latitude and longitude data in response to the vehicle not being online; and send the latitude and longitude data to the vehicle in response to reconnection of the vehicle.

11. The computer-readable storage medium according to claim 9, wherein the processor is further configured to:

send the second text data of the target point of interest to the vehicle, wherein the second text data is broadcast by the vehicle.

* * * * *